(12) United States Patent
Huang

(10) Patent No.: US 11,989,524 B2
(45) Date of Patent: May 21, 2024

(54) KNOWLEDGE-GROUNDED DIALOGUE SYSTEM AND METHOD FOR LANGUAGE LEARNING

(71) Applicant: ELECTRONICS AND TELECOMMUNICATIONS RESEARCH INSTITUTE, Daejeon (KR)

(72) Inventor: Jinxia Huang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 340 days.

(21) Appl. No.: 17/504,976

(22) Filed: Oct. 19, 2021

(65) Prior Publication Data

US 2022/0139248 A1 May 5, 2022

(30) Foreign Application Priority Data

Nov. 5, 2020 (KR) .................. 10-2020-0146762

(51) Int. Cl.
*G06F 40/35* (2020.01)
*G06N 20/00* (2019.01)
*G09B 7/00* (2006.01)

(52) U.S. Cl.
CPC ............. *G06F 40/35* (2020.01); *G06N 20/00* (2019.01); *G09B 7/00* (2013.01)

(58) Field of Classification Search
CPC .................................. G06F 40/35; G09B 7/00
See application file for complete search history.

(56) References Cited

U.S. PATENT DOCUMENTS 9,230,544 B2    1/2016  Kwon et al.
9,812,028 B1 *  11/2017 Elchik .................... G09B 19/06
(Continued)

FOREIGN PATENT DOCUMENTS

KR   10-2009-0058320    6/2009
KR   10-1635144         6/2016
(Continued)

OTHER PUBLICATIONS

Emily Dinan et al., "Wizard of Wikipedia: Knowledge-Powerered Conversational Agents"; Facebook AI Research, published as a conference paper at ICLR 2019; pp. 1-18.

*Primary Examiner* — Shaun Roberts
(74) *Attorney, Agent, or Firm* — KILE PARK REED & HOUTTEMAN PLLC

(57) ABSTRACT

The present invention solves difficulties in constructing a dialogue corpus, ensures the accuracy of a system utterance, and evaluates a user utterance in a dialogue technology for language learning and a knowledge-grounded dialogue technology, in which a system and method is capable of helping a learner in language learning by constructing a language learning dialogue corpus using passages and exercises commonly used in language education and learning sites, training a dialogue model and a dialogue evaluation model with the language learning dialogue corpus, and allowing a user and a system to have a dialogue on the basis of a given passage. It is expected that it will be possible to implement a dialogue system for language learning that is capable of performing evaluation and easily expanding a domain (expansion of learning content).

13 Claims, 8 Drawing Sheets

```
                                                    R100
R101
    [PASSAGE]
    My aunt loves flowers. And she likes to grow flowers. She grows many flower in her home garden,
    including roses, 5 orchids, two types of lilies, and also daisies.

R102    1.[QUESTION] _ like to grow flowers.
R103    [CANDIDATE ANSWERS] O: A. My aunt, B. My uncle, C. My mom, D. My friend
R104    [CORRECT ANSWER] A 2.[QUESTION] She has _ orchids.
        [CANDIDATE ANSWERS] O: A.10, B.2, C.5, D.7
        [CORRECT ANSWER] C
        ...
```

(56) References Cited

U.S. PATENT DOCUMENTS

| | | | |
|---|---|---|---|
| 2014/0272909 A1* | 9/2014 | Isensee | G09B 7/02 |
| | | | 434/362 |
| 2016/0063879 A1* | 3/2016 | Vanderwende | G06F 16/3329 |
| | | | 434/322 |
| 2017/0068986 A1* | 3/2017 | Chan | G06Q 30/0245 |
| 2017/0323577 A1* | 11/2017 | Elchik | G06F 40/211 |
| 2018/0366111 A1* | 12/2018 | Jang | G10L 15/02 |
| 2019/0043379 A1* | 2/2019 | Yuan | G09B 7/02 |
| 2019/0114322 A1 | 4/2019 | Huang | |
| 2019/0130904 A1* | 5/2019 | Homma | G10L 15/18 |
| 2019/0228070 A1* | 7/2019 | Lu | G06N 3/044 |
| 2020/0160199 A1* | 5/2020 | Al Hasan | G06N 20/00 |
| 2020/0211417 A1 | 7/2020 | Huang | |
| 2021/0209139 A1* | 7/2021 | Wu | G06F 40/35 |

FOREIGN PATENT DOCUMENTS

| | | |
|---|---|---|
| KR | 10-2019-0039079 | 4/2019 |
| KR | 10-2020-0036366 | 4/2020 |

\* cited by examiner

[PASSAGE]
My aunt loves flowers. And she likes to grow flowers. She grows many flower in her home garden, including roses, 5 orchids, two types of lilies, and also daisies.

1.[QUESTION] _ like to grow flowers.
[CANDIDATE ANSWERS] O: A. My aunt, B. My uncle, C. My mom, D. My friend
[CORRECT ANSWER] A 2.[QUESTION] She has _ orchids.
[CANDIDATE ANSWERS] O: A.10, B.2, C.5, D.7
[CORRECT ANSWER] C

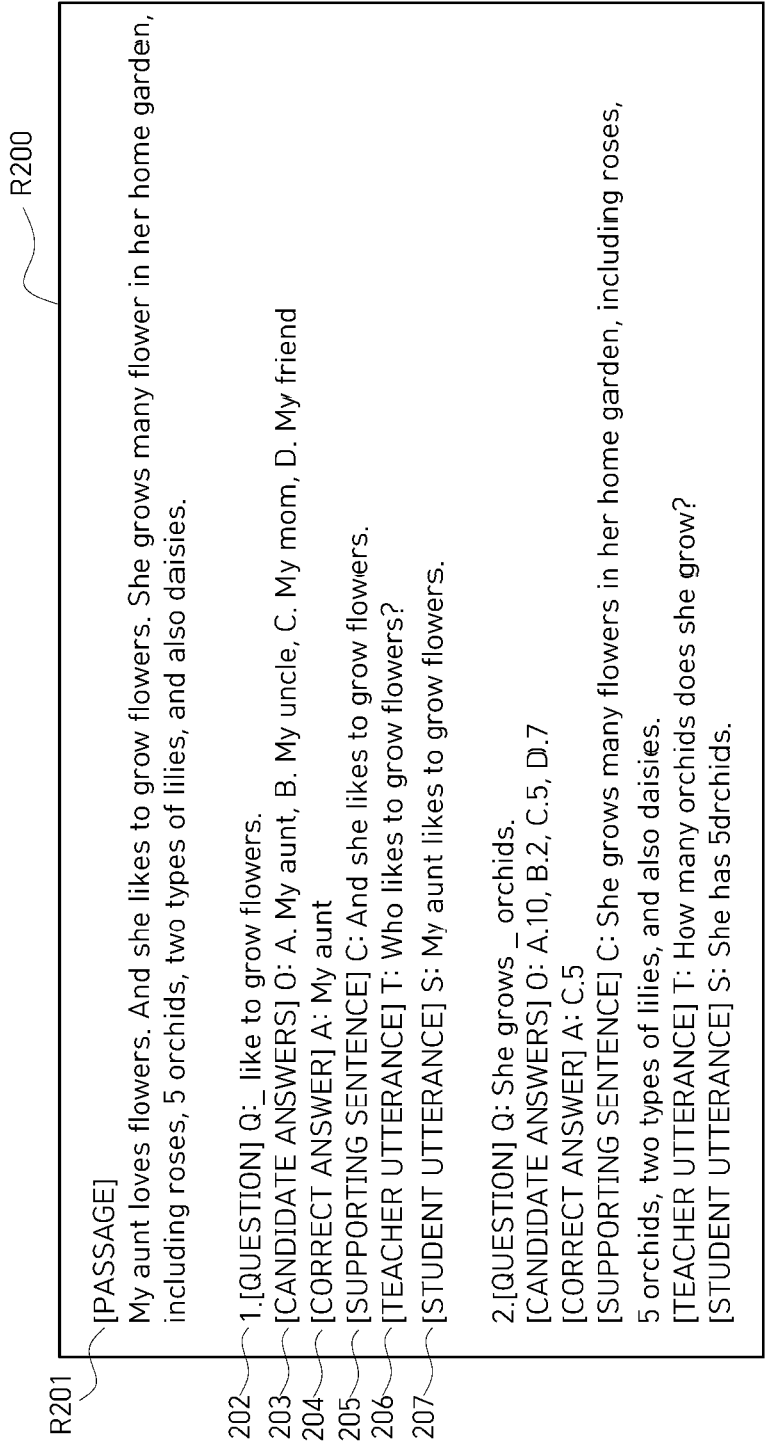

[PASSAGE]
My aunt loves flowers. And she likes to grow flowers. She grows many flower in her home garden, including roses, 5 orchids, two types of lilies, and also daisies.

1.[QUESTION] Q: _ like to grow flowers.
[CANDIDATE ANSWERS] O: A. My aunt, B. My uncle, C. My mom, D. My friend
[CORRECT ANSWER] A: My aunt
[SUPPORTING SENTENCE] C: And she likes to grow flowers?
[TEACHER UTTERANCE] T: Who likes to grow flowers?
[STUDENT UTTERANCE] S: My aunt likes to grow flowers.

2.[QUESTION] Q: She grows _ orchids.
[CANDIDATE ANSWERS] O: A.10, B.2, C.5, D).7
[CORRECT ANSWER] A: C.5
[SUPPORTING SENTENCE] C: She grows many flowers in her home garden, including roses, 5 orchids, two types of lilies, and also daisies.
[TEACHER UTTERANCE] T: How many orchids does she grow?
[STUDENT UTTERANCE] S: She has 5drchids.

KNOWLEDGE-GROUNDED DIALOGUE SYSTEM AND METHOD FOR LANGUAGE LEARNING

CROSS-REFERENCE TO RELATED APPLICATION

This application claims priority to and the benefit of Korean Patent Application No. 10-2020-0146762, filed on Nov. 5, 2020, the disclosure of which is incorporated herein by reference in its entirety.

BACKGROUND

1. Field of the Invention

The present invention relates to a technology of dialogue for language learning or teaching (hereinafter dialogue for language learning), and more specifically, to a system and method in which a language learning dialogue corpus is designed to train a dialogue system, so that a language learner learns the language through the dialogues with the system.

2. Discussion of Related Art

Major background technologies of the present invention include 'dialogue for language education' technology and 'knowledge-grounded dialogue' technology. In addition, as a technology related to those technologies, there is 'question answering' technology.

As for the dialogue for language education technology, a system helps a language learner to improve his/her language ability through a dialogue with him/her. The dialogue needs to proceed according to a given dialogue scenario, but a certain freedom is allowed in the order or expression of an utterance. For example, in a dialogue for ordering a pizza, a drink may be ordered after selecting a pizza, or a pizza and a drink may be ordered at the same time. Such a dialogue scenario (also referred to as a dialogue map) in the conventional dialogue system is difficult to construct, and in particular, in order to construct dialogue scenarios for language education, professionals who understand both language education and dialogue scenario construction are required. In the case of a open-domain dialogue technology, that is, chatbots, appropriateness and accuracy of an utterance are an issue, and in-depth utterances on various topics are not possible. Thus chatbots are not suitable for use in the field of language education.

The knowledge-grounded dialogue technology enables a human and a machine to have a dialogue about a given text. To do so, a system learns a corpus including a text and a dialogue regarding the text and then dialogues with a user about the given text and subject. In order to use that technology in a specific field, constructing a dialogue corpus including a text, and accurately evaluating a system dialogue are important issues. In particular, in order to use the technology in language education, evaluation of a user utterance needs to be handled. As such, the conventional knowledge-grounded dialogue technology has limitations in use in language education due to difficulty in evaluating accuracy.

Meanwhile, the question answering technology related to the two technologies is a technology that, given a text and a query, finds the related part from the text for the query, then extracts or generates an answer and provides it to the user. The so-called machine reading comprehension system is an example of using such a question answering technology.

SUMMARY OF THE INVENTION

The present invention is directed to solving difficulties in constructing a dialogue corpus, ensuring the accuracy of a system utterance, and evaluating a user utterance in a dialogue for language education technology and a knowledge-grounded dialogue technology. Through the present invention, it is expected that it will be possible to implement a dialogue system for language learning that is capable of performing evaluation and easily expanding a domain (i.e., expansion of learning content).

The present invention is directed to providing a system and method capable of helping a learner in language learning by constructing a language learning dialogue corpus using passages and exercises commonly used in language teaching and learning sites, training a dialogue model and a dialogue evaluation model with the language learning dialogue corpus, and allowing a user and a system to have a dialogue on the basis of a given passage.

The technical objectives of the present invention are not limited to the above, and other objectives may become apparent to those of ordinary skill in the art based on the following description.

According to one aspect of the present invention, there is provided a knowledge-grounded dialogue system for language learning that includes: a dialogue corpus generating unit configured to generate a language learning dialogue corpus from reading comprehension data comprising a passage and an exercise, the exercise comprising at least one of a question, a candidate answer, and a correct answer; a knowledge-grounded dialogue model training unit configured to train a dialogue model using the generated language learning dialogue corpus; a dialogue evaluation model training unit configured to train a dialogue evaluation model using the generated language learning dialogue corpus; a dialogue evaluation unit configured to receive a passage, an exercise, and a dialogue history and evaluate a latest utterance using the trained dialogue evaluation model; and a dialogue generating unit configured to receive the passage, the exercise, the dialogue history, and an evaluation result of the dialogue evaluation unit and generate a system utterance.

According to another aspect of the present invention, there is provided a knowledge-grounded dialogue method for language learning that includes: generating a language learning dialogue corpus from reading comprehension data comprising a passage and an exercise, the exercise comprising at least one of a question, an answer, and a candidate answer; training a dialogue model using the generated language learning dialogue corpus; training a dialogue evaluation model using the generated language learning dialogue corpus; receiving a passage, an exercise, and a dialogue history, and evaluating a latest utterance using the trained dialogue evaluation model; and receiving the passage, the exercise, the dialogue history, and an evaluation result of the dialogue evaluation step and generating a system utterance.

According to still another aspect of the present invention, there is provided a knowledge-grounded dialogue corpus for language learning generated from reading comprehension data comprising a passage and an exercise, the exercise comprising at least one of a question, an answer, and a candidate answer, the knowledge-grounded dialogue corpus comprising: a teacher utterance generated from the question comprised in the reading comprehension data, and a student utterance generated from at least one of the correct answer and the candidate answer comprised in the reading comprehension data.

The configuration and effects of the present invention will become more apparent based on specific embodiments described with reference to the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 4 is an exemplary diagram illustrating a language learning dialogue corpus (R200) of FIG. 1;

DETAILED DESCRIPTION OF EXEMPLARY EMBODIMENTS

Hereinafter, the advantages and features of the present invention and ways of achieving them will become readily apparent with reference to descriptions of the following detailed embodiments in conjunction with the accompanying drawings. However, the present invention is not limited to such embodiments and may be embodied in various forms. The embodiments to be described below are provided only to complete the disclosure of the present invention and assist those of ordinary skill in the art in fully understanding the scope of the present invention, and the scope of the present invention is defined only by the appended claims. Terms used herein are used to aid in the description and understanding of the embodiments and are not intended to limit the scope and spirit of the present invention. It should be understood that the singular forms "a" and "an" also include the plural forms unless the context clearly dictates otherwise. The terms "comprises," "comprising," "includes," and/or "including," when used herein, specify the presence of stated features, integers, steps, operations, elements, components, and/or groups thereof and do not preclude the presence or addition of one or more other features, integers, steps, operations, elements, components, and/or groups thereof.

Hereinafter, exemplary embodiments of the present invention will be described in detail with reference to the accompanying drawings. In the description of the embodiments, a detailed description of related known functions or configurations will be omitted to avoid obscuring the subject matter of the present invention. In addition, in the following description, for the sake of convenience in description, English is assumed as a language to be learned in all examples, but the present invention may be used in education or learning of all languages irrespective of a specific language.

Before describing the embodiments of the present invention, for the sake of convenience in understanding, concept definitions are provided as follows: the term 'dialogue history' refers to a part or all of a dialogue conducted between a user and a system about a given passage; and the term 'latest utterance' refers to the latest utterance received by the system as an input.

Figure 1:
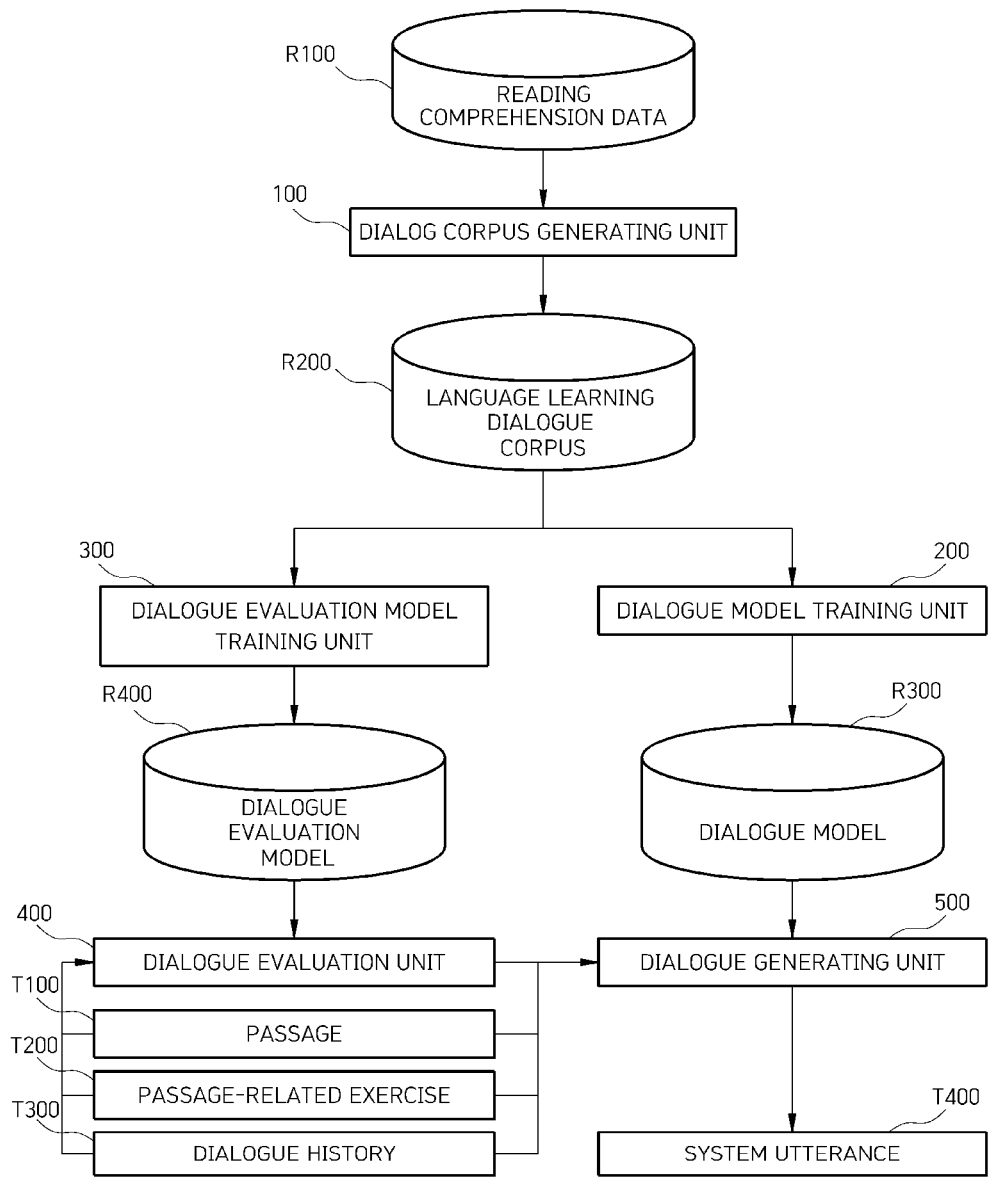
FIG. 1 is a block diagram illustrating a language learning dialogue system according to the present invention.

A knowledge-grounded dialogue system for language learning according to the present invention is configured as shown in FIG. 1. The language learning dialogue system shown in FIG. 1 includes: a dialogue corpus generating unit 100 configured to generate a language learning dialogue corpus R200 from a reading comprehension data R100; a knowledge-grounded dialogue model training unit 200 configured to train a dialogue model R300 using the language learning dialogue corpus R200 generated; a dialogue evaluation model training unit 300 configured to train a dialogue evaluation model R400 using the language learning dialogue corpus R200 generated; a dialogue evaluation unit 400 configured to receive a passage T100, a passage-related exercise T200, and a dialogue history T300 including a latest utterance, and to evaluate the latest utterance on the basis of the dialogue evaluation model R400 trained; and a dialogue generating unit 500 configured to receive the passage T100, the passage-related exercise T200, the dialogue history T300, and the evaluation result of the dialogue evaluation unit 400 to generate a system utterance T400.

Figure 2:
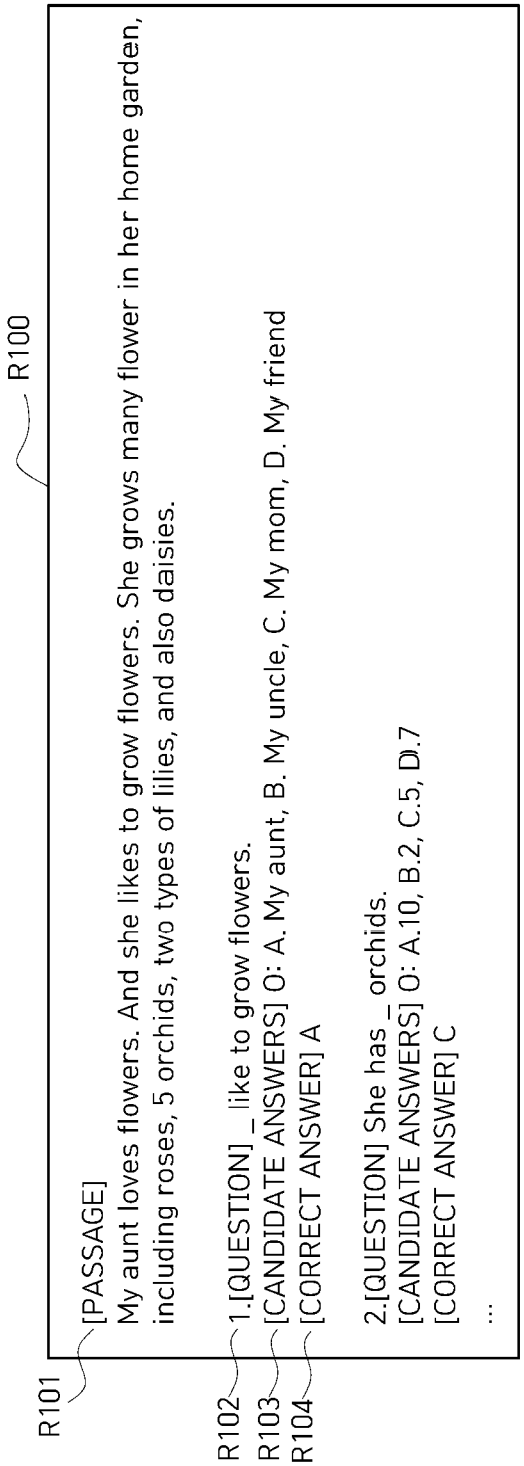
FIG. 2 is an exemplary diagram illustrating reading comprehension data (R100)

FIG. 2 is an exemplary diagram illustrating the reading comprehension data R100.

In the knowledge-grounded dialogue system for language learning in FIG. 1, the reading comprehension data R100 includes general passages and exercises for language learning/education, and one passage has an exercise including at least one of a question, an correct answer, and a candidate answer. I.e., as shown in FIG. 2, the reading comprehension data R100 includes at least one of a passage R101, a question R102, a candidate answer R103, and a correct answer R104. Here, the term 'reading comprehension' refers to 'reading and comprehension'(also referred to as 'reading') used in the field of language learning/education.

In FIG. 2, only an example of the reading comprehension data R100 is illustrated, and actually exercises of the reading comprehension data may be provided in various formats. For example, the exercise may include only a pair of question R102 and correct answer R104 without the candidate answer R103, or may include the candidate answer R103 in addition to the pair of question R102 and correct answer R104. Also, the correct answer R104 to Question 1 may be expressed in text such as "My aunt" instead of 'A' shown in FIG. 2.

Figure 3:
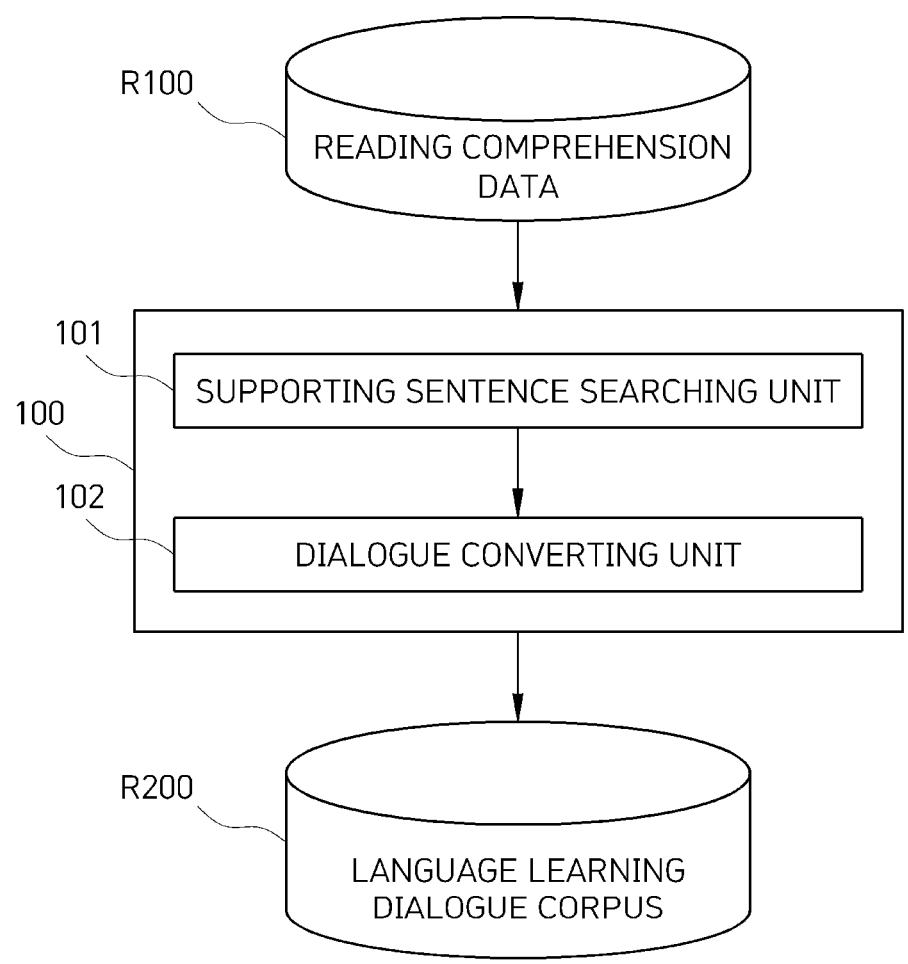
FIG. 3 is a block diagram illustrating the dialogue corpus generating unit (100)

FIG. 3 is a configuration diagram illustrating the dialogue corpus generating unit 100. The dialogue corpus generating unit 100 includes a supporting sentence searching unit 101 and a dialogue converting unit 102.

The supporting sentence searching unit 101 searches for a supporting sentence to the correct answer R104 in the given passage R101 by referring to the question R102 and the correct answer R104 of the reading comprehension data R100 shown in FIG. 2.

The dialogue converting unit 102 converts the question R102 and the correct answer R104 from the reading comprehension data R100, into a dialogue for the language learning dialogue corpus R200. For example, as shown in FIG. 2, the dialogue converting unit 102 converts the question R102 having a blank into an interrogative sentence, and, if the correct answer R104 is a word or phrase, adopts the word or phrase as a response without change or converts the word or phrase into a complete response sentence. As an example, the dialogue converting unit 102 converts "[Question (R102)] likes to grow flowers." shown in FIG. 2 into an interrogative sentence "Who likes to grow flowers?" and converts "[Correct Answer (R104)] My aunt" into a response sentence "My aunt likes to grow flowers."

As an example of a method of converting the question R102 into a spoken sentence for a dialogue, the dialogue converting unit 102, if the correct answer R104 is a word or phrase, may classify the type of correct answer R104 into a number, time, place, person, etc. (the types of correct answer are merely provided as an example and may be variously defined), or, if the correct answer R104 is a sentence, may classify whether the sentence is related to a cause or a method; and then may convert the question R102 into an interrogative sentence in the form of How, When, Where, Who, Which, Why, etc. with reference to the classifications. As a method of determining the type of interrogative sentence to which the question is to be converted, a rule-based method or a learning-based method may be used in various ways. Meanwhile, in the case of converting the correct answer R104 into a spoken sentence for a dialogue, the dialogue converting unit 102 may adopt the correct answer R104 without change to use it as a short response (e.g., when the correct answer is "My aunt", the response is also "My aunt." or is "The answer is: my aunt."); or may use a rule-based or pattern-based method that converts the correct answer R104 into a complete sentence by substituting the correct answer R104 into a blank of the question R102 (e.g., when the question is "likes to grow flowers." and the correct answer is "My aunt", the question is regarded as a pattern and the correct answer is substituted into a blank of the question to generate the response "My aunt likes to grow flowers."); or, when a sufficient amount of training data is present, a response may be generated by a learning-based method (e.g., a seq2seq (sequence-to-sequence)-based deep learning method that has a question and an answer as an input while having a response as an output). In addition, after constructing a complete response sentence using the rule-based or pattern-based method, various spoken response sentences may be generated using a paraphrasing technique.

The supporting sentence searching unit 101 and the dialogue converting unit 102 of the dialogue corpus generating unit 100 may be implemented in various ways. According to one possible implementation form, the supporting sentence searching unit 101 may search for a supporting sentence having a similarity to the question R102 and the correct answer R104, by using a conventional information search technique or a learning-based classification technique. In order to search for such a supporting sentence, a similar sentence needs to be calculated. The calculation of the similar sentence may be performed using various ways, such as a word-based similarity calculation, a word vector or sentence vector based similarity calculation, etc. In addition, the dialogue converting unit 102, in response to a sufficient amount of data for training, may generate (convert) an interrogative sentence for a question-type dialogue from the question R102 by referring to the correct answer R104, by using a machine learning; or in response to insufficiency of data for training, may generate an interrogative sentence using a pattern-based or rule-based method, and to this end, analysis tools, such as for morpheme analysis, syntax analysis, etc., may be used.

For example, in the case of using the machine learning, the dialogue converting unit 102 may, by using the correct answer R104 and the question R102 as example data, may classify a question type by regarding a question generation problem as a classification problem by using the question type "who, when, where, what, why, and how" as a classification category, and then may substitute the question type word ("who, when," etc.) into the blank of the question R102 to generate an interrogative sentence. In addition, when a large-capacity pre-trained language model is used, the correct answer R104 and the question R102 may be used as input data and the generated interrogative sentence may be used as output data such that a pre-trained language model is subjected to fine tuning to thereby train an interrogative sentence generation model. In addition, when the pattern- or rule-based method is used, the question R102 and the correct answer R104 are analyzed, and the question type is classified into "who" if the correct answer is a person, "when" if the correct answer is a time, "where" if the correct answer is a place, and "what" if the correct answer is an object; and in the case of other types, by analyzing whether the type of question R102 is related to a cause or is related to a method, the question type is classified into "why" or "how." In such analysis, various methods, such as morpheme analysis, syntax analysis, semantic analysis, and entity name analysis may be used.

In an additional embodiment, the dialogue converting unit 102, in order to construct a dialogue similar to actual language education/learning situations, may generate a wrong utterance through conversion by referring to the candidate answer R103 together with the correct answer R104. In this case, the dialogue converting unit 102 may additionally generate an utterance for inducing the correct answer by referring to the supporting sentence found by the supporting sentence searching unit 101 together with the question R102 (for example, in the case that a student gives no answer or a wrong answer "My mom" rather than the correct answer "My aunt" to a question "likes to grow flowers." in FIG. 4, the system may generate a sentence of the correct answer-inducing utterance "Read the text, it says, who loves flowers and likes to grow flowers. So the answer is?" by referring to the supporting sentence "My aunt loves flowers. And she likes to grow flowers." in the passage). Further the dialogue converting unit 102 may generate a reference utterance by referring to the candidate answer R103, with regard to a response to the correct answer-inducing utterance.

FIG. 4 is an exemplary diagram illustrating a language learning dialogue corpus R200 of FIG. 1.

Referring to FIG. 4, an example of the language learning dialogue corpus R200 converted and generated by the dialogue corpus generating unit 100 may include a passage R201, a question R202, a candidate answer R203, an answer R204, a supporting sentence R205, a teacher utterance R206, and a student utterance R207.

The passage R201, the question R202, the candidate answer R203, and the correct answer R204 included in the language learning dialogue corpus R200 in FIG. 4 are the same as those in FIG. 2, and however, a separation mark may be added before (or before and after) the text so that the text can be distinguished during learning. For example, in the case of a system utterance in FIG. 4, a separator mark "[teacher utterance]" may be used before the relevant text. When separation marks are added before and after the text, a separation mark "[teacher utterance]" may be used before the text and a separation mark "[/teacher utterance]" may be used after the text. Such separation marks are only an example; in actual use, a symbol such as "[TEU]" may be used to facilitate data processing.

Here, the teacher utterance R206 and the student utterance R207 are terms used for intuitive understanding: the teacher utterance refers to a "question utterance" (or "a question and feedback utterance") and the student utterance refers to a "response utterance" (or "an answer" or "a response-providing utterance"). In actual use, the teacher utterance and the student utterance may be used in various ways, like as, the system asks a question and the user responds, or the user asks a question (e.g., "Who likes to grow flowers?" or "I don't know who likes to grow flowers.") and the system gives the correct answer, or the like. That is, the system may generate a response utterance or a question utterance according to the user utterance. However, in actual use, the system may be trained to generate only a "teacher utterance" (i.e., a "question utterance," or a "question and feedback utterance),'" which is a case when the system described in the present invention is desired to be used only as a "teacher model" (or a "question model"); or as another embodiment, the system may be trained to generate only a "student utterance" (i.e., a "response utterance," or a "correct answer or response-providing utterance")," which is a case when the system described in the present invention is desired to be used only as a "student model" (or a "response model"). When a model is trained without the system utterance being restricted to a specific type, the model is referred to as a "general purpose model."

Referring again to FIG. 4, the supporting sentence R205 is a result of the dialogue corpus generating unit 100 (specifically, the supporting sentence searching unit 101 of FIG. 3). The teacher utterance R206 is the one generated by being converted from the question R102 shown in FIG. 2. The student utterance R207 is generated by being converted from the correct answer R104 and/or the candidate answer R103 shown in FIG. 2. The teacher utterance R206 and student utterance R207 converted and generated constitute a pair of utterances (called as a dialogue turn). Each dialogue turn has one or more supporting sentences R205, and the turns are gathered to form a dialogue history (the utilization of the dialogue history will be described below). To generate the teacher utterance R206 and the student utterance R207, the supporting sentence R205 may not be needed. In other words, if the teacher utterance R206 and the student utterance R207 can be generated without the supporting sentence R205, the supporting sentence R205 will not need to be included in the language learning dialogue corpus R200 shown in FIG. 4.

Figure 5:
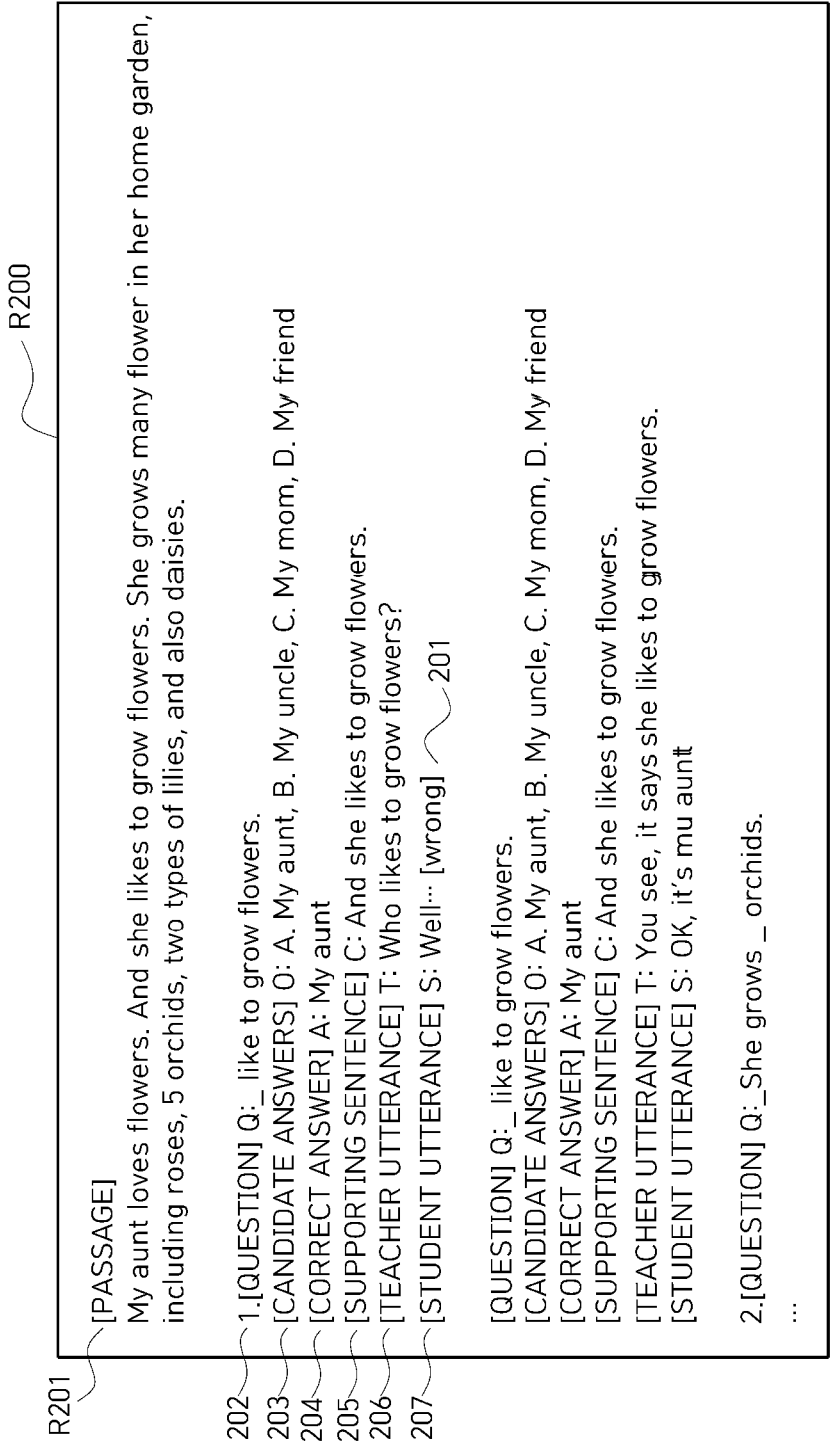
FIG. 5 is another exemplary diagram illustrating the language learning dialogue corpus (R200) of FIG. 1.

FIG. 5 is another exemplary diagram illustrating the language learning dialogue corpus R200 converted and generated by the dialogue corpus generating unit 100 of FIG. 1, which shows an example of a dialogue including a wrong answer.

How many wrong answers are to be included in one dialogue corpus and how many times the correct answer is to be induced by the teacher utterance R206 before allowing a reference utterance may be determined by setting the percentage of wrong answers in the whole student utterances R207 in advance, and by converting and generating the utterances. The types of wrong answers in the student utterances may be varied, such as a response that states "I don't know," other responses that are not the correct answer, no response, etc. When the student utterance is a wrong answer, the utterance may be attached with a tag (for example, a tag [wrong] 210 in FIG. 5).

In addition, if the language learning dialogue corpus R200 converted and generated by the dialogue corpus generating unit 100 is insufficient in terms of diversity or accuracy, the corpus automatically converted and generated using the dialogue corpus generating unit 100 may be modified and supplemented with human intervention to thereby save manpower and time. That is, the dialogue corpus generating unit 100 may be used for semi-automatic construction of a dialogue.

Referring again to FIG. 1, the knowledge-grounded dialogue model training unit 200 uses a neural network based deep learning method. While the conventional knowledge-grounded dialogue model training unit learning technology, which does not use passage-related exercises, has a limitation in generating a language learning dialogue that requires high accuracy, the present invention utilizes language reading comprehension exercises to thereby improve the accuracy of a dialogue.

Figure 6:
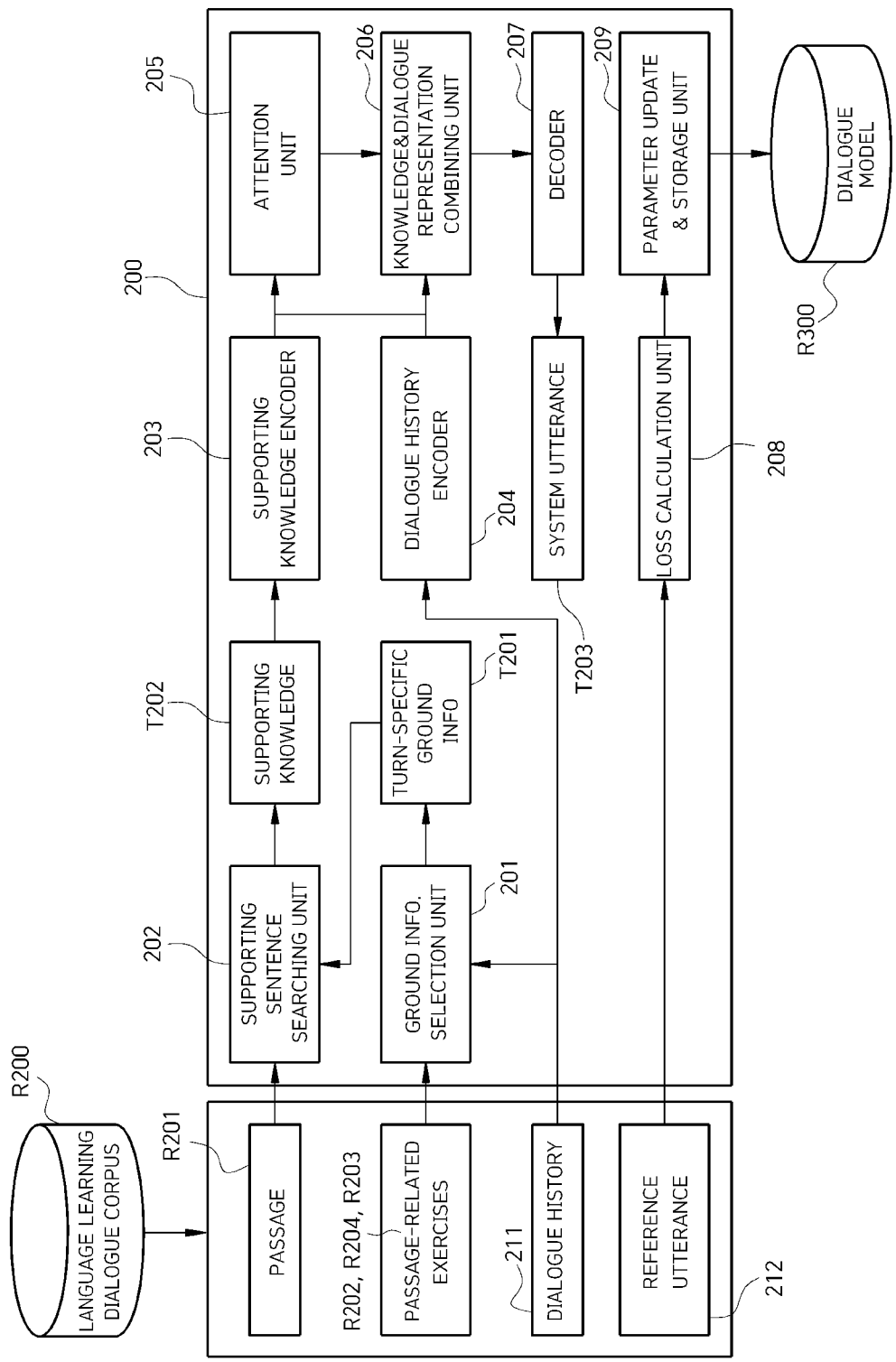
FIG. 6 is an exemplary diagram illustrating a knowledge-grounded dialogue model training unit (200)

FIG. 6 illustrates an exemplary diagram illustrating the knowledge-grounded dialogue model training unit 200 using a language learning dialogue corpus including language reading comprehension exercises.

Here, the term 'dialogue history 211' refers to a dialogue history formed by gathering dialogue turns of the teacher utterance R206 and the student utterance R207, and has the same basic meaning as that of the dialogue history defined at the beginning.

In FIG. 6, an embodiment of the knowledge-grounded dialogue model training unit 200 includes: a ground information selection unit 201 configured to select information (ground information) for finding supporting sentences for each turn from passage-related exercises R202, R204, and R203 in consideration of a dialogue history 211 and output the selected ground information as turn-specific ground information T201; a supporting sentence searching unit 202 configured to search for supporting sentences from a passage R201 using the turn-specific ground information T201 as a query, and output supporting knowledge T202 comprising supporting sentences and the turn-specific ground information T201; a supporting knowledge encoder 203 configured to encode the supporting knowledge T202; a dialogue history encoder 204 configured to encode the dialogue history 211; an attention unit 205 configured to perform attention to the encoded dialogue history 211 and the supporting knowledge T202 to assign weights to more important supporting knowledge T202; a knowledge and dialogue representation combining unit 206 configured to provide a knowledge and dialogue representation through a combination of vector representations of the encoded dialogue history 211 and the weighted supporting knowledge T202; a decoder 207 configured to decode the combined knowledge and dialogue representation to generate a system utterance T203; a loss calculation unit 208 configured to compare the generated system utterance T203 with a reference utterance 212 to calculate a loss; and a parameter update and storage unit 209 configured to perform batch learning through backpropagation to the calculated loss and then update parameters, and to perform epoch learning and then store the parameters in a dialogue model R300.

Here, the ground information selection unit 201 considers the dialogue history 211 of the teacher utterance R206 and the student utterance R207, and if the latest utterance was a student utterance R207, outputs the question R202 and the correct answer R204, which are pieces of ground information selected from the passage-related exercises R202, R204, and R203, as the turn-specific ground information T201, because the system utterance T203 is to be a teacher utterance R206; and if the latest utterance was a teacher utterance R206 in the dialogue history, outputs the question R202 and/or the candidate answer R203, which are selected pieces of ground information, as the turn-specific ground information T201, because the system utterance T203 is to be a student utterance R207. This means that the knowledge-grounded dialogue model training unit 200 can also be used as a general-purpose model capable of producing a teacher utterance or a student utterance according to the latest input utterance.

In addition to using the knowledge-grounded dialogue model training unit 200 as a general-purpose model, as part of the purpose of improving system performance, the system may be trained only with a teacher utterance so as to be used as a teacher model (that is, a "question model") such that the system utterance is restricted to the teacher utterance. The purpose may be achieved by specifying the passage-related exercises R202, R204, and R203 of FIG. 6 as the question R202 and the correct answer R204, and exclusively using only a dialogue history having a student utterance R207 as the latest utterance among dialogue history (i.e., by specifying the latest utterance as the student utterance R207), and training the dialogue model. On the other hand, in order to achieve the above purpose, the system may be used only as a student model (i.e., a "response model"), such that only a student utterance is used as a training utterance. The purpose may be achieved by specifying the passage-related exercises R202, R204, and R203 of FIG. 6 as the question R202 and/or the candidate answer R203, and exclusively using only a dialogue history having a teacher utterance R206 as the latest utterance among dialogue history (i.e., by specifying the latest utterance as the teacher utterance R206), and training the dialogue model.

Figure 7:
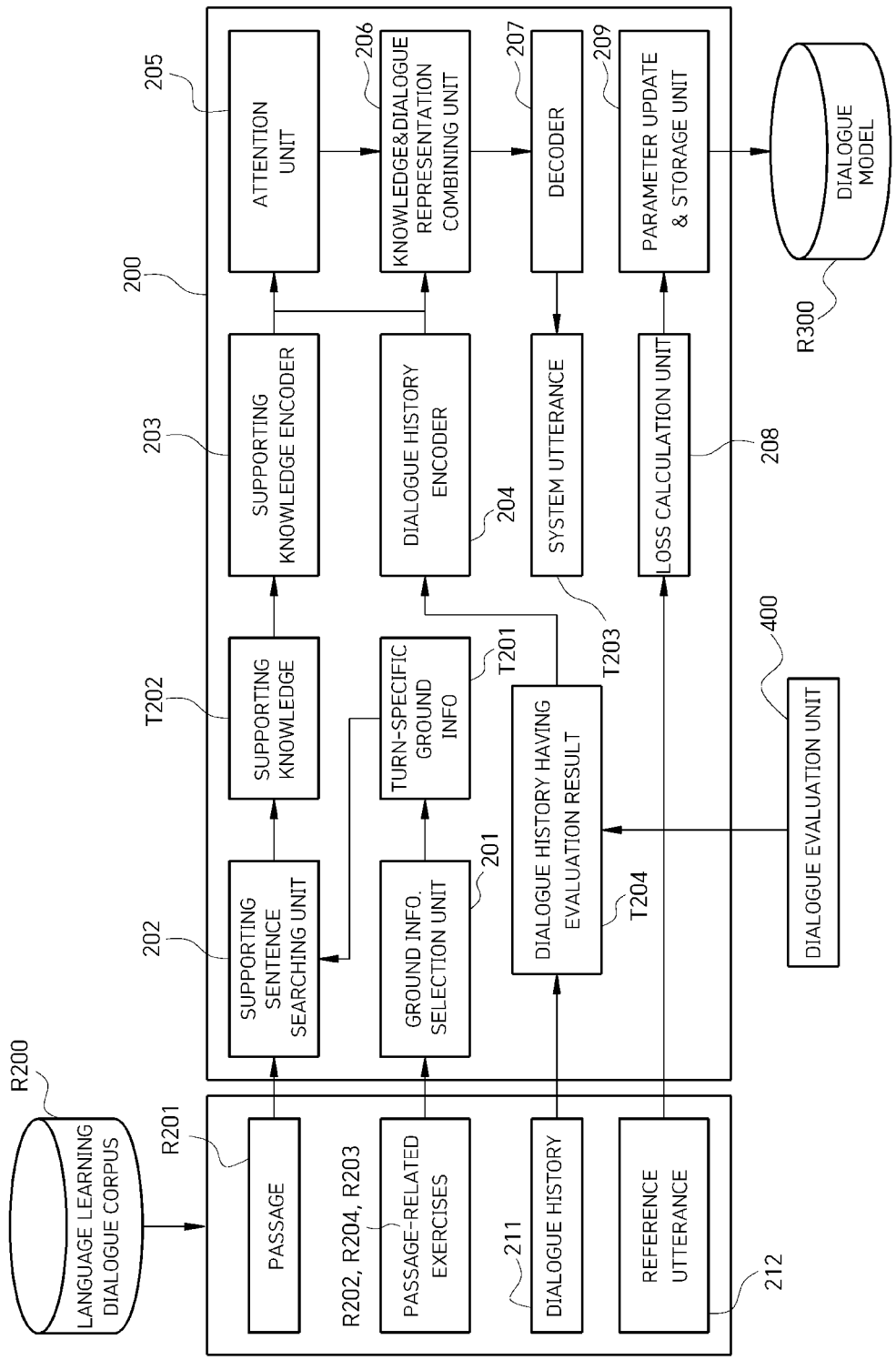
FIG. 7 is another exemplary diagram illustrating the knowledge-grounded dialogue model training unit (200)

FIG. 7 is another exemplary diagram illustrating the knowledge-grounded dialogue model training unit 200, which shows a dialogue model training unit using a result of the dialogue evaluation unit 400. In the case of FIG. 7, the dialogue model training unit 200 receives an output of the dialogue evaluation unit 400 as an input thereto. Specifically, the dialogue model training unit 200 adds the result of the dialogue evaluation unit (400 in FIG. 1) to the dialogue history 211 to generate a dialogue history having an evaluation result T204 and input it to the dialogue history encoder 204 so that the dialogue model 200 may use it.

As described above, the knowledge-grounded dialogue model training unit 200 may utilize various pre-trained language models or pre-trained dialogue models in application thereof.

Figure 8:
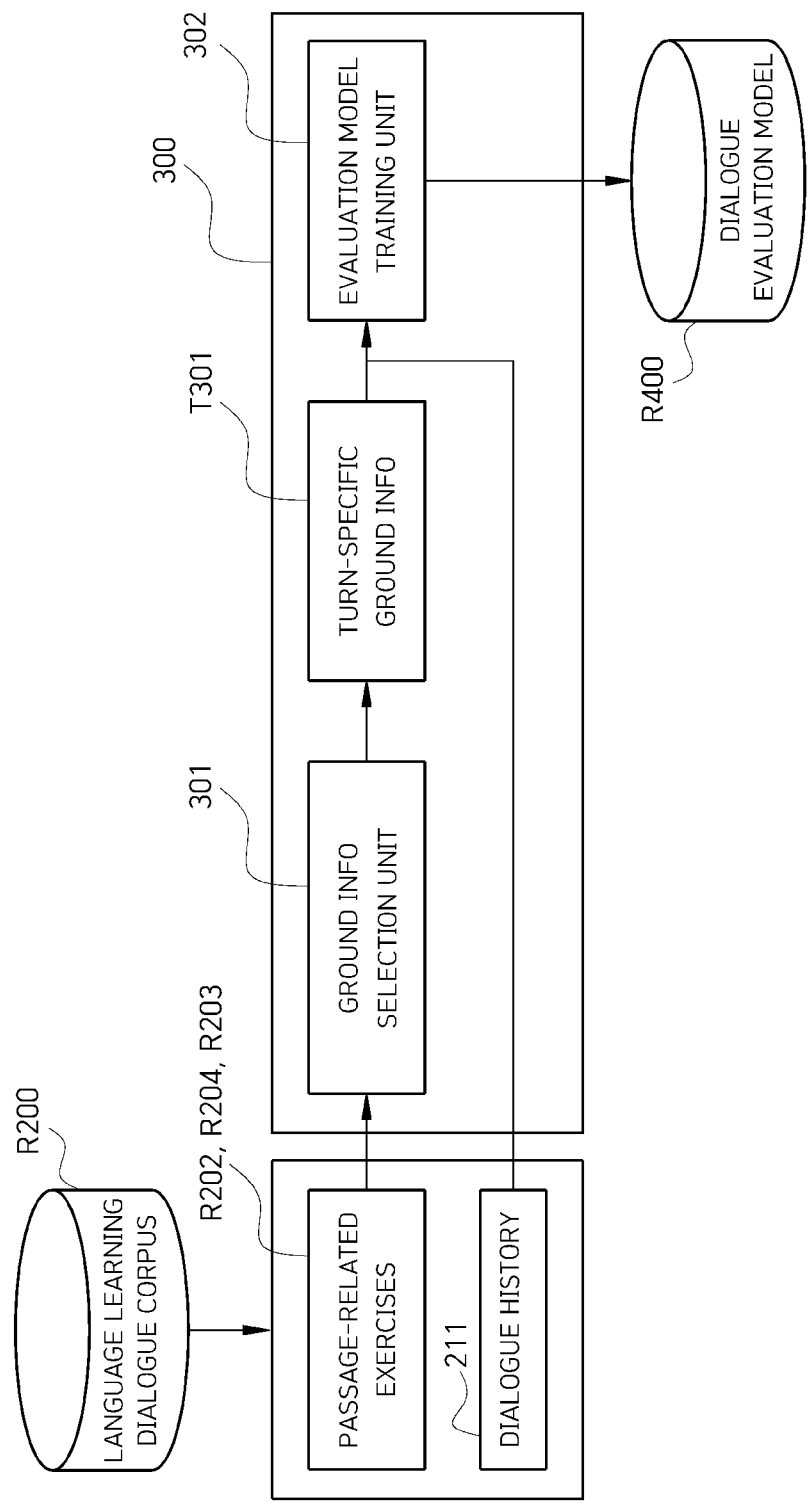
FIG. 8 is an exemplary diagram illustrating a dialogue evaluation model training unit (300).

FIG. 8 is a block diagram illustrating a configuration of the dialogue evaluation model training unit 300.

The dialogue evaluation model training unit 300 has a ground information selection unit 301 and an evaluation model training unit 302. When the latest utterance of the dialogue history 211 is the student utterance R207, the ground information selection unit 301 outputs the correct answer R204 and/or the candidate answer R203 as turn-specific ground information T301, and the evaluation model training unit 302 either trains a classification-based evaluation model for classifying whether the corresponding utterance matches the correct answer R204 or trains a regression-based evaluation model for evaluating the score of the student utterance R207 compared to the correct answer R204. On the other hand, when the latest utterance in the dialogue history 211 is the teacher utterance R206, the ground information selection unit 301 outputs the question R202 and the supporting sentence R205 as turn-specific ground information T301, and the evaluation model training unit 302 trains a model for classifying whether the corresponding utterance is similar to the question R202 or the supporting sentence R205.

Here, the evaluation model training unit 302 may be divided into two independent units, i.e., a student utterance evaluation model training unit and a teacher utterance evaluation model training unit. In the present invention, the configuration or method of the evaluation model training unit 302 is not specified and may employ classification or regression methods using various machine learning techniques or deep learning techniques.

Since the dialogue evaluation unit 400 and the dialogue generating unit 500 shown FIG. 1 use the same method and structure as the dialogue evaluation model training unit 300 and the knowledge-grounded dialogue model training unit 200, except for a part of calculating a loss and updating parameters while storing a model, descriptions of the configurations of the dialogue evaluation unit 400 and the dialogue generating unit 500 will be omitted.

As is apparent from the above, the present invention, in order to overcome the difficulty of constructing a dialogue scenario in a dialogue system for language education, automatically generates a language learning dialogue corpus having correct answers using reading comprehension exercises, thereby addressing the shortcomings associated with taking a lot of professional manpower and a great deal of time in constructing dialogue data for language education in the conventional dialogue system for language education. The present invention allows educational companies having language reading comprehension materials to easily construct a language learning dialogue corpus, and thus language education services using dialogue systems can be greatly expanded.

In addition, the conventional open-domain dialogue technology including knowledge-grounded dialogue technology has limitations in the use for language education due to the difficulty in accuracy evaluation. Accordingly, the present invention designed a language learning dialogue corpus including reading comprehension exercises, and thus evaluation of student utterances can be performed using the language learning dialogue corpus having correct answers, which allows deep learning-based dialogue technology to be used in language education.

In addition, although the conventional text comprehension-based dialogue technology finds ground knowledge and generates a dialogue using only text knowledge and dialogue history information, the present invention can enable more accurate search for supporting sentences and generation of system utterances using exercises of a language learning dialogue corpus.

Although the present invention has been described with reference to the embodiments, a person of ordinary skill in the art should appreciate that various modifications, equivalents, and other embodiments are possible without departing from the scope and sprit of the present invention. Therefore, the embodiments disclosed above should be construed as being illustrative rather than limiting. The scope of the present invention is not defined by the above embodiments but by the appended claims of the present invention, and the present invention is to cover all modifications, equivalents, and alternatives falling within the spirit and scope of the present invention.

What is claimed is:
1. A knowledge-grounded dialogue system for language learning, comprising:
 a dialogue corpus generator configured to generate a language learning dialogue corpus from reading com- prehension data, comprising a passage and a passage-related exercise, the passage-related exercise comprising at least one of a question, a candidate answer, and a correct answer, wherein the language learning dialogue corpus comprises: a passage; at least one of a question, a correct answer, and a candidate answer comprised in the passage-related exercise; a teacher utterance generated from the question comprised in the reading comprehension data; and a student utterance generated from at least one of the correct answer and the candidate answer comprised in the reading comprehension data;

a knowledge-grounded dialogue model trainer configured, to train a dialogue model using the generated language learning dialogue corpus;

a dialogue evaluation model trainer configured, to train a dialogue evaluation model using the generated language learning dialogue corpus;

a dialogue evaluator configured, to receive the passage, the passage-related exercise, and a dialogue history that includes a dialogue conducted between a user and a system about a passage and evaluate a latest utterance received by the system as an input, using the trained dialogue evaluation model; and a dialogue generator configured, to receive the passage, the exercise, the dialogue history, and an evaluation result of the dialogue evaluator and generate a system utterance, wherein the dialogue corpus generator comprises a supporting sentence searcher configured, to support the sentence to the correct answer in the passage by referring to the question and the correct answer of the reading comprehension data; and a dialogue converter configured, to convert the at least one of the question, the correct answer, and the candidate answer comprised in the reading comprehension data into a dialogue for the language learning dialogue corpus, and wherein the knowledge-grounded dialogue model trainer is configured, to train the dialogue model using the dialogue history with an evaluation result that is the dialogue history to which a result of the dialogue evaluator has been added.

2. The knowledge-grounded dialogue system for language learning of claim 1, wherein the knowledge-grounded dialogue model trainer is configured to train the dialogue model using the passage, the at least one of the question, the correct answer, and the candidate answer comprised in the exercise related to the passage, and the dialogue history.

3. The knowledge-grounded dialogue system for language learning of claim 1, wherein the knowledge-grounded dialogue model trainer is configured to train a student model using the passage, the question and the correct answer comprised in the exercise related to the passage, and a dialogue history having the teacher utterance as a latest utterance among the dialogue history.

4. The knowledge-grounded dialogue system for language learning of claim 1, wherein the knowledge-grounded dialogue model trainer is configured to train a teacher model using the passage, the question, and the correct answer comprised in an exercise related to the passage, and a dialogue history having the student utterance as a latest utterance among the dialogue history.

5. The knowledge-grounded dialogue system for language learning of claim 1, wherein the knowledge-grounded dialogue model trainer comprises:

a knowledge and dialogue representation combiner configured, to represent a knowledge with the dialogue history through a combination of vector representation of the dialogue history; and a decoder configured, to decode the combined knowledge and dialogue representation to generate the system utterance.

6. The knowledge-grounded dialogue system for language learning of claim 1, wherein the dialogue evaluation model trainer comprises:

a ground information selector configured, to output at least one of the correct answer and the candidate answer as ground information; and an evaluation model trainer configured, to train an evaluation model that evaluates a score of an utterance.

7. The knowledge-grounded dialogue system for language learning of claim 1, wherein the dialogue evaluation model trainer comprises:

a ground information selector configured, to output the question as turn-specific ground information with reference to the reading comprehension data by the dialogue corpus generator; and an evaluation model trainer configured, to train a model for classifying whether an utterance is similar to the question.

8. The knowledge-grounded dialogue system for language learning of claim 1, wherein the dialogue evaluation model trainer comprises:

a teacher utterance evaluation model trainer configured, to, when the latest utterance in the dialogue history, which is an input of the knowledge-grounded dialogue system for language learning, is a teacher utterance, train a model for evaluating the teacher utterance; and a student utterance evaluation model trainer configured, to, when the latest utterance in the dialogue history, which is an input of the knowledge-grounded dialogue system for language learning, is a student utterance, train a model for evaluating the student utterance.

9. A knowledge-grounded dialogue method for language learning, comprising:

generating a language learning dialogue corpus from reading comprehension data comprising a passage and a passage-related exercise, the passage-related exercise comprising at least one of a question, a correct answer, and a candidate answer, wherein the language learning dialogue corpus comprise: a passage; one of a question, a correct answer, and a candidate answer comprised in the passage-related exercise; a teacher utterance generated from the question comprised in the reading comprehension data; and a student utterance generated from at least one of the correct answer and the candidate answer comprised in the reading comprehension data;

training a dialogue model using the generated language learning dialogue corpus;

training a dialogue evaluation model using the generated language learning dialogue corpus;

receiving the passage, the passage-related exercise, and a dialogue history that includes a dialogue conducted between a user and a system about a passage, and evaluating a latest utterance received, using the trained dialogue evaluation model; and receiving the passage, the exercise, the dialogue history, and an evaluation result of the dialogue evaluation step and generating a system utterance, wherein the dialogue corpus generating comprises searching a supporting sentence for supporting the sentence to the correct answer in the passage by referring to the question and the correct answer of the reading comprehension data; and converting the at least one of the question, the correct answer, and the candidate answer comprised in the reading comprehension data into a dialogue for the language learning dialogue corpus, and wherein the knowledge-grounded dialogue model training comprises training the dialogue model using the dialogue history with an evaluation result that is the dialogue history, to which a result of the dialogue evaluating has been added.

10. The knowledge-grounded dialogue method for language learning of claim 9, wherein the training of the dialogue model comprises training the dialogue model using the at least one of the question, the correct answer, and the candidate answer comprised in the exercise; and the dialogue history comprising the teacher utterance and the student utterance.

11. The knowledge-grounded dialogue method for language learning of claim 9, wherein the training of the dialogue model comprises:

representing a knowledge and dialogue through a combination of vector representations of the dialogue history; and decoding the combined knowledge and dialogue representation to generate the system utterance.

12. The knowledge-grounded dialogue method for language learning of claim 9, wherein the training of the dialogue evaluation model comprises:

outputting at least one of the correct answer and the candidate answer as ground information; and training an evaluation model that evaluates a score of an utterance.

13. The knowledge-grounded dialogue method for language learning of claim 9, wherein the training of the dialogue evaluation model comprises:

outputting the question as turn-specific ground information with reference to the reading comprehension data; and training a model for classifying whether an utterance is similar to the question.

* * * * *